US012399979B2

(12) United States Patent
Lin et al.

(10) Patent No.: US 12,399,979 B2
(45) Date of Patent: Aug. 26, 2025

(54) PROVISIONING A SECURITY COMPONENT FROM A CLOUD HOST TO A GUEST VIRTUAL RESOURCE UNIT

(71) Applicant: MICROSOFT TECHNOLOGY LICENSING, LLC, Redmond, WA (US)

(72) Inventors: Jin Lin, Redmond, WA (US); Michael Bishop Ebersol, Redmond, WA (US); David Kimler Altobelli, Redmond, WA (US); Jingbo Wu, Medina, WA (US); Qiang Wang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 285 days.

(21) Appl. No.: 17/826,658

(22) Filed: May 27, 2022

(65) Prior Publication Data

US 2023/0334144 A1   Oct. 19, 2023

Related U.S. Application Data

(60) Provisional application No. 63/332,671, filed on Apr. 19, 2022.

(51) Int. Cl.
*G06F 21/53*  (2013.01)
*G06F 9/50*   (2006.01)
*G06F 21/54*  (2013.01)
*G06F 21/55*  (2013.01)
*G06F 21/57*  (2013.01)

(52) U.S. Cl.
CPC ............ *G06F 21/53* (2013.01); *G06F 9/5077* (2013.01); *G06F 21/54* (2013.01); *G06F 21/554* (2013.01); *G06F 21/577* (2013.01)

(58) Field of Classification Search
CPC ........ G06F 21/53; G06F 21/54; G06F 21/554; G06F 21/577; G06F 9/5077; G06F 9/545; G06F 2209/542
See application file for complete search history.

(56) References Cited

U.S. PATENT DOCUMENTS 12,052,285 B1 * 7/2024 Anjaneyapura Range ................. H04L 63/20
2009/0204964 A1 * 8/2009 Foley ..................... G06F 21/53 718/1

(Continued)

*Primary Examiner* — Alexander Lagor
*Assistant Examiner* — Taylor P Vu
(74) *Attorney, Agent, or Firm* — Newport IP, LLC; Jacob P. Rohwer

(57) ABSTRACT

The techniques disclosed herein enable a system to configure a confidential virtual resource unit by provisioning a security component to a tenant's virtual resource unit. The system creates multiple different virtual trust layers within the confidential virtual resource unit. This creation effectively defines security boundaries between the virtual trust layers. The virtual trust layers are associated with different privileges, such that a higher privileged virtual trust layer is provided with more privileges compared to a lower privileged virtual trust layer. In one example, a lower privileged virtual trust layer may include basic virtual resource components (e.g., drivers, applications, processes, functions, workloads executing within a guest operating system) and a higher privileged virtual trust layer is the location to which a virtual security component is provisioned by the system.

20 Claims, 7 Drawing Sheets

(56) References Cited

U.S. PATENT DOCUMENTS

| | | | |
|---|---|---|---|
| 2014/0040890 A1* | 2/2014 | Novak | G06F 21/53 |
| | | | 718/1 |
| 2016/0048680 A1* | 2/2016 | Lutas | G06F 12/1009 |
| | | | 726/23 |
| 2016/0191545 A1* | 6/2016 | Nanda | H04L 43/20 |
| | | | 726/1 |
| 2016/0205007 A1* | 7/2016 | Syed | H04L 43/062 |
| | | | 709/224 |
| 2019/0034633 A1* | 1/2019 | Seetharamaiah | G06F 9/45558 |
| 2019/0034666 A1* | 1/2019 | Boivie | G06F 21/53 |
| 2019/0278928 A1* | 9/2019 | Rungta | G06F 9/45533 |
| 2021/0110065 A1* | 4/2021 | Trivedi | G06F 21/85 |
| 2021/0240818 A1* | 8/2021 | Seksenov | G06F 16/986 |
| 2021/0263779 A1* | 8/2021 | Haghighat | G06F 9/5061 |
| 2022/0067147 A1* | 3/2022 | Schmid | G06F 21/52 |

* cited by examiner

PROVISIONING A SECURITY COMPONENT FROM A CLOUD HOST TO A GUEST VIRTUAL RESOURCE UNIT

PRIORITY APPLICATION

The present application is a non-provisional application of, and claims priority to, U.S. Provisional Application Ser. No. 63/332,671 filed on Apr. 19, 2022, the contents of which are hereby incorporated by reference in their entirety.

BACKGROUND

As cloud computing gains popularity, more and more data and/or services are stored and/or provided online via network connections. Providing an optimal experience at a large scale is an important aspect for cloud-based platforms (e.g., AMAZON WEB SERVICES, GOOGLE CLOUD, MICROSOFT AZURE) that offer network services. In many scenarios, a cloud-based platform may provide a service to thousands or millions of tenants geographically dispersed around a country, or even the world. In order to provide this service, a cloud-based platform often includes different resources, such as servers, hosted in various datacenters. As used herein, a tenant may refer to a user, a client, or a customer.

The servers in a datacenter are physical machines configured with "host" components. The host components can be hardware, software, firmware, or a combination thereof, and these components are operated by, or under control of, the cloud-based platform. More specifically, a host component can include a host operating system and/or a virtual resource monitor (e.g., a hypervisor) configured to create and/or execute virtual resources such as a virtual machine. Furthermore, a host component can include a security component that performs essential security operations for the virtual resources. One example of a security component is the Trusted Platform Module (TPM). The security component may include a cryptographic processor, memory to store security information (e.g., encryption keys, certificates), and/or secured input/output interfaces to enable interaction with the host operating system and/or the virtual resource monitor. Consequently, the security component provides a layer of security for data that is used by the virtual resources being executed on an underlying server.

SUMMARY

The disclosed techniques provide an increased level of isolation for virtual resources configured in a cloud-based platform by limiting and/or eliminating the interactions between the virtual resources and the host components of a server on which the virtual resources are configured. To do this, a cloud-based platform emulates the security component, previously configured on a server in association with a host operating system, within a virtual resource unit configured on behalf of a tenant. In other words, the cloud-based platform moves the functionality performed by the security component from the server to the tenant's virtual resource unit.

A virtual resource unit described herein may be referred to as a "confidential" virtual resource unit because tenant data is isolated from lower privileged components such as the host operating system kernel, the user-mode, and/or operators (e.g., developers, programmers) of the host. In one example, the lower privileged components, from which the tenant data is isolated, includes the software in the host. In this example, the higher privileged components, from which the tenant data is not isolated, includes host hardware such as the physical central processing unit (CPU) and the cryptographic processor.

As used herein, a virtual resource unit is defined as a separate and/or divisible execution environment for an application, a function, a process, a workload, or the like. Thus, a virtual resource unit can be a virtual machine, a container, and so forth. The system described herein can determine if a tenant's virtual resource unit is to be configured as a confidential virtual resource unit. In one example, the determination is made based on a tenant request that is specifically tied to the configuration and launch of a virtual resource unit. In another example, the determination is made based on a tenant subscription that defines all of the tenant's virtual resource units are to be configured as confidential virtual resource units. In yet another example, the determination is made based on a tenant subscription that defines a type of data to be used (e.g., health data, financial data, sensitive user data such as social security numbers) and/or a type of service to be provided by a virtual resource unit.

Once it is determined that a tenant's virtual resource unit is to be configured as a confidential virtual resource unit, the system creates multiple different virtual layers within the confidential virtual resource unit. This creation effectively defines security boundaries between the virtual layers. The virtual layers are associated with different privileges, such that a higher privileged virtual layer is given more trust and/or provided with more privileges compared to a lower privileged virtual layer. To this end, these virtual layers may be referred to as virtual trust layers (VTLs). In one example, a lower privileged virtual trust layer includes basic virtual resource components (e.g., drivers, applications, processes, functions, workloads executing within a guest operating system) and a higher privileged virtual trust layer is the location to which a virtual security component is provisioned by the system, as further described below.

The virtual security component performs security operations for the virtual resource unit (e.g., operations to create and store cryptographic keys, operations to secure communications, operations to confirm that operating system components have not been tampered with by an unauthorized actor). One example of a virtual security component is a virtual Trusted Platform Module (vTPM). Via a higher privileged virtual trust layer, the virtual security component may include secure access to a cryptographic processor on the host which is configured to encrypt the memory partitions used by a confidential virtual resource unit and/or to encrypt CPU execution states of the confidential virtual resource unit.

The system is configured to establish the security boundary between two virtual trust layers within the confidential virtual resource unit by applying a security-based rule within the virtual resource monitor (e.g., hypervisor) of the host. The security-based rule uses hardware virtualization features to create regions of memory for the virtual trust layers, and where applicable, isolate a region of memory for a higher privileged virtual trust layer from the host components and/or from lower privileged virtual trust layers. For instance, the security-based rule can assign a memory partition to each of the virtual trust layers in the confidential virtual resource unit. The memory partition assigned to a higher privileged virtual trust layer is hidden from the components executing within a lower privileged virtual trust layer. Thus, the lower privileged virtual trust layer within which basic resource (e.g., operating system) components are executing have no visibility into the memory partition assigned to a higher privileged virtual trust layer where the security component resides.

In one example, the security-based rule comprises Virtual-Based Security (VBS) which employs a Virtual Secure Mode (VSM). VSM is a set of hypervisor capabilities offered to the host operating system and to the guest operating systems configured within virtual machines. The hypervisor capabilities are configured to create and manage security boundaries within operating system software. For example, VSM enables software in the root operating system and the guest operating systems to create and/or access isolated partitions of memory for storage and processing of security assets. Access to these isolated partitions of memory is controlled through the hypervisor. Consequently, if basic system level software executing in a supervisor mode (e.g., kernel, drivers) of a lower privileged virtual trust layer is compromised by malicious software, then the assets of a higher privileged virtual trust layer in an isolated memory partition are still protected and remain secured.

After the virtual trust layers are created in the virtual resource unit, the system is configured to provision the virtual security component to the virtual trust layer that has a higher privileges compared to a virtual trust layer that executes the basic resource components (e.g., drivers, applications, processes, functions, workloads). In this sense, the virtual security component configured within a higher privileged virtual trust layer of the virtual resource unit emulates the functionality of the security component previously implemented in the host. By passing, or moving, the functionality of the security component from the host to the higher privileged virtual trust layer in the tenant's virtual resource unit, the tenant's data is isolated from vulnerabilities of the host.

When the basic resource components executing in the lower privileged virtual trust layer of the tenant's virtual resource unit makes a call for a security operation to the virtual resource monitor, the higher privileged virtual trust layer in the tenant's virtual resource unit intercepts the call and the virtual security component performs the security operation within the tenant's confidential virtual resource unit rather than within the host. Again, performance of the security operation via the virtual security component utilizes server hardware (e.g., a cryptographic processor) to encrypt the memory partitions used by the virtual resource unit and/or to encrypt CPU execution states of the virtual resource unit.

Consequently, implementing a virtualized version of the security component in a tenant's virtual resource unit (e.g., a guest operating system, a guest process) provides an improved level of isolation for virtual resource units (e.g., virtual machines, containers) executing in a cloud-based platform. This provides an additional layer of security for tenants that store and use sensitive data (e.g., financial data, health data, government data, user data such as social security numbers). That is, the secure partitioning of memory for virtual trust layers enables the virtual security component to operate at a higher privileged virtual trust layer that eliminates exposure to other programming code (e.g., guest operating system code) executing at a lower privileged virtual trust layer.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein provide systems for isolating virtual resources configured in a cloud-based platform by limiting and/or eliminating the interactions between the virtual resources and some of the host components of a cloud server on which the virtual resources are configured. To do this, a cloud-based platform emulates a security component within a virtual resource unit configured on behalf of a tenant, which may be referred to herein as a "tenant" virtual resource unit. Consequently, the cloud-platform acts as the host and the tenant acts as a guest.

The disclosed system addresses confidentiality issues for tenants of a cloud-based platform. For instance, as discussed above, a host server in a cloud-based platform includes host components (e.g., components that are part of a host operating system) and a host security component. In one example, the host security component is a Trusted Platform Module (TPM). Unfortunately, cyberattacks are becoming more sophisticated and these more sophisticated cyberattacks can expose some of the host components to new forms of data breaches. Consequently, tenant data communicated over channels between the virtual resources and the host components (e.g., channels provided by the virtual resource monitor) may also be exposed in the event of a data breach. This potential exposure may be intolerable to some tenants of the cloud-based platform. For instance, tenants that provide confidential services that have access to a customer's sensitive data (e.g., health data, financial data, user data such as social security numbers) may avoid using a cloud-based platform due to the exposure provided via the communications channels between the virtual resources and the host components.

Accordingly, a cloud-based platform described herein moves the functionality performed by the security component from the host server to the tenant virtual resource unit. Various examples, scenarios, and aspects that enable the provisioning of a virtual security component are described below with respect to FIGS. 1-7.

Figure 1:
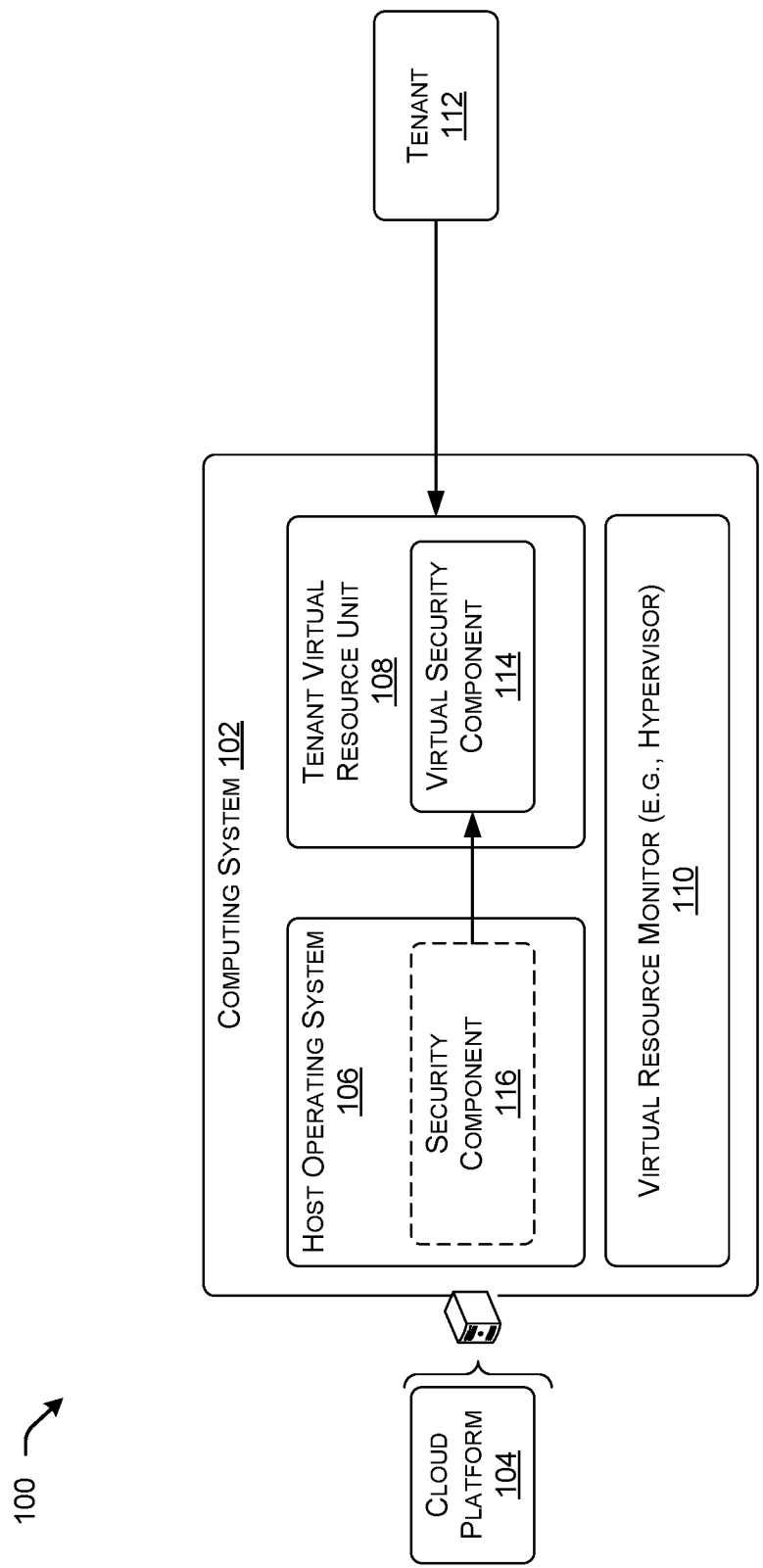
FIG. 1 illustrates an example environment where a security component previously configured in association with a host operating system is provisioned to a tenant virtual resource unit.

FIG. 1 illustrates an environment 100 where a security component previously configured in association with a host operating system is provisioned to a tenant virtual resource unit. As shown, a computing system 102 such as a host server can be configured within a cloud platform 104. The computing system 102 includes a host operating system 106, at least one tenant virtual resource unit 108, and a virtual resource monitor 110 that enables the computing system 102 to create and execute the tenant virtual resource unit 108 on behalf of a tenant 112. More specifically, the virtual resource monitor 110, such as a hypervisor, enables communication channels between the tenant virtual resource unit 108 and host components included in, or associated with, the host operating system 106.

A tenant virtual resource unit 108 is considered a "confidential" virtual resource unit when, as further described herein, tenant data is isolated from lower privileged components such as the host operating system kernel, user-mode, and/or operators (e.g., developers, programmers) of the host. In one example, the lower privileged components, from which the tenant data is isolated, includes the software (e.g., any software) that is part of the host. In this example, the higher privileged components, from which the tenant data is not isolated, includes host hardware such as the physical central processing unit (CPU) and the cryptographic processor.

A virtual resource unit 108 is defined as a separate and/or divisible execution environment for an application, a function, a process, a workload, or the like. Thus, a virtual resource unit 108 can be a virtual machine, a container, and so forth.

The computing system 102 can determine if a virtual resource unit is to be configured as a confidential virtual resource unit based on input from the tenant 112. In one example, the determination is made based on a tenant request (e.g., received via an application programming interface) that is specifically tied to the configuration and launch of a particular virtual resource unit. In another example, the determination is made based on a tenant subscription that defines all of the tenant's virtual resource units are to be configured as confidential virtual resource units. In yet another example, the determination is made based on a tenant subscription that defines a type of data to be used (e.g., health data, financial data, sensitive user data such as social security numbers) and/or a type of service to be provided by a virtual resource unit. In some scenarios, a determination with respect to a confidential virtual resource unit does not need to be made (e.g., all virtual resource units in a cloud-based platform are configured as confidential resource units).

Once it is determined that a tenant's virtual resource unit is to be configured as a confidential virtual resource unit, the computing system 102 implements operations to provision a virtual security component 114 to the tenant virtual resource unit 108, which thereby makes the virtual resource unit 108 a confidential virtual resource unit. As described above, the virtual security component 114 is configured to emulate functionality performed by a security component 116 configured in association with the host operating system 106. This emulation provides an improved level of isolation for tenant virtual resource units executing in the cloud-based platform 104, at least because the data accessed and handled in association with security operations is isolated from lower privileged components such as the host operating system kernel, the user-mode, and/or operators (e.g., developers, programmers) of the host. In some examples, the data is further isolated from the hypervisor and/or the virtualization management stack. Consequently, tenants that store and use sensitive data (e.g., financial data, health data, government data, user data such as social security numbers) in the public cloud are provided with robust mechanisms that instill increased confidence in public cloud security.

Figure 2:
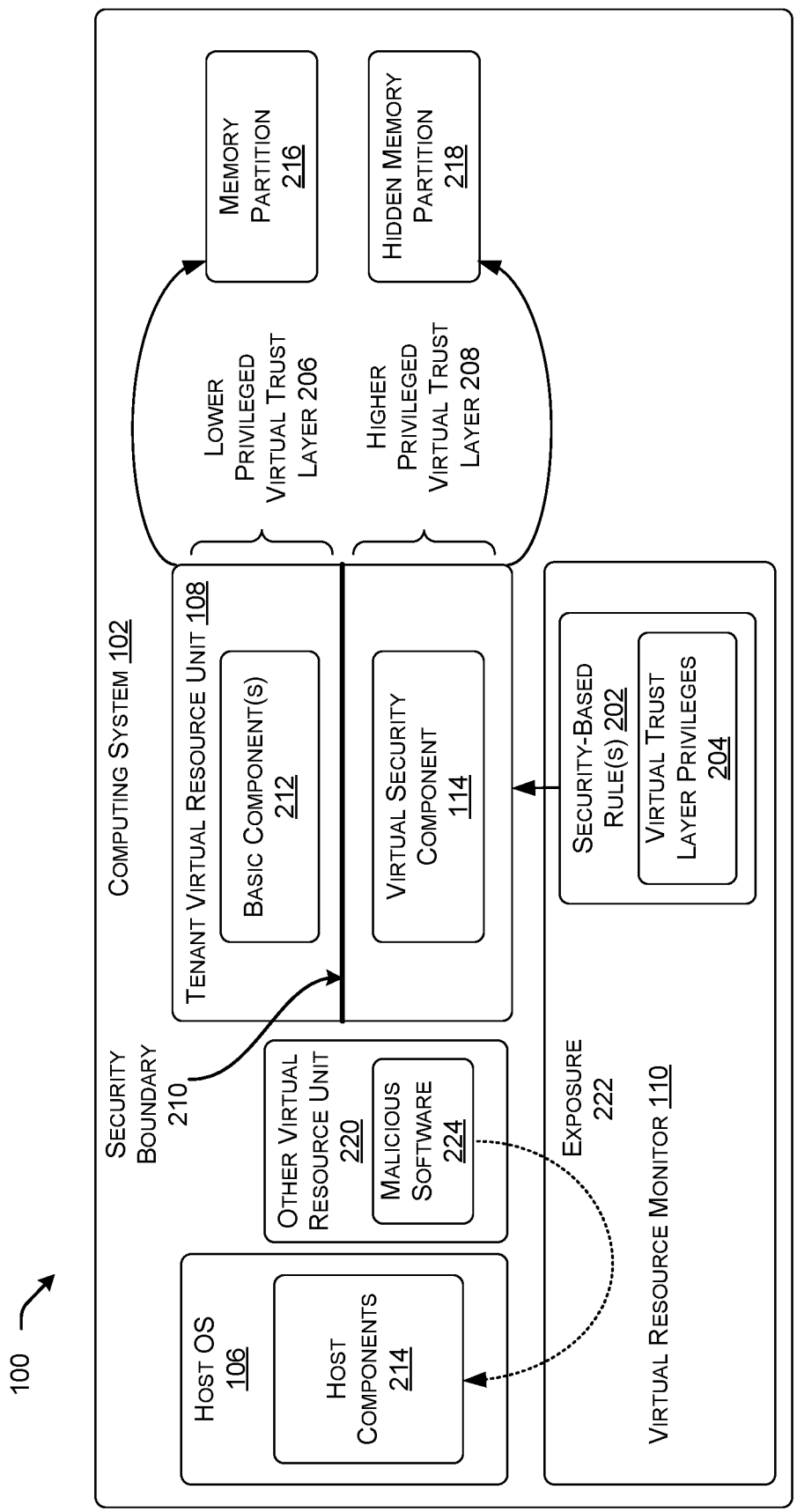
FIG. 2 illustrates an example environment where a security-based rule is implemented to create virtual trust layers and a security boundary to enable the provisioning of the security component to the tenant virtual resource unit.

FIG. 2 further illustrates the environment 100 of FIG. 1 in which a security-based rule 202 is implemented by the virtual resource monitor 110 of the computing system 102 to create different virtual trust layers in the tenant virtual resource unit 108. As shown, the security-based rule 202 is configured to associate different virtual trust layers with different privileges 204. To this end, the security-based rule 202 is able to create a lower privileged virtual trust layer 206 and a higher privileged virtual trust layer 208. The terms "lower" and "higher" are used in this context to capture the relationship for the virtual trust layers 206 and 208 with respect to privileges. It is understood that the security-based rule 202 can create any number of virtual trust layers within a confidential virtual resource unit, and that each virtual trust layer may have more or less privileges relative to another virtual trust layer.

The creation of the virtual trust layers 206 and 208 effectively creates a security boundary 210. In other words, the higher privileged virtual trust layer 208 is provided with more privileges compared to the lower privileged virtual trust layer 210. Consequently, the lower privileged virtual trust layer 206 may include basic virtual resource components 212 (e.g., drivers, applications, processes, functions, workloads executing within a guest operating system) and a higher privileged virtual trust layer 208 is the location to which the virtual security component 114 is provisioned by the computing system 102.

To enable the virtual trust layers and the security boundary 210, the security-based rule 202 uses hardware virtualization features to create regions of memory and/or isolate a region of memory for a higher privileged virtual trust layer 208 from lower privileged host components 214 (e.g., the host operating system kernel) and/or from lower privileged virtual trust layer(s) 206. For instance, the security-based rule 202 can assign a first memory partition 216 to the lower privileged virtual trust layer 206 and a second memory partition 218 to the higher privileged virtual trust layer 208.

The memory partition 218 assigned to the higher privileged virtual trust layer 208 is hidden from the basic components 212 executing within the lower privileged virtual trust layer 206, and can be referred to as a "hidden" memory partition. Thus, the lower privileged virtual trust layer 206 within which basic components 212 are executing have no visibility into the memory partition 218 assigned to the higher privileged virtual trust layer 208, where the virtual security component 114 resides. Moreover, both memory partitions 216 and 218 can be hidden from the lower privileged host components 214.

The security-based rule 202 is configured to hide the memory partition 218, or limit visibility into the memory partition 218, using "Second Level Address Translation" (SLAT), also referred to as nested paging. SLAT is a hardware-assisted virtualization technology which uses two levels of translation when a request to access memory is received. That is, a processor first uses a nested page table to translate a virtual address to an address associated with virtual memory allocated to the virtual resource unit by the host. The processor then uses a page table to perform a second translation of the address associated with allocated virtual memory to a physical address in the host memory.

In one example, the security-based rule comprises Virtual-Based Security (VBS) which employs a Virtual Secure Mode (VSM). VSM is a set of hypervisor capabilities offered to the host operating system 106 and the guest operating systems configured within virtual machines. The hypervisor capabilities are configured to create and manage security boundaries within operating system software. For example, VSM enables software in the root operating system and the guest operating systems to create and/or access isolated partitions of memory for storage and processing of security assets. Access to these isolated partitions of memory is controlled through a hypervisor. Consequently, if basic system level software executing in a supervisor mode (e.g., kernel, drivers) of a lower privileged virtual trust layer is compromised by malicious software, then the assets of a higher privileged virtual trust in an isolated memory partition are still protected and remain secured.

After the virtual trust layers 206 and 208 are created in the tenant virtual resource unit 108, the computing system 102 is configured to provision the virtual security component 114 to the virtual layer 208 that has higher privileges compared to a virtual layer 206 that executes the basic resource components 212 (e.g., drivers, applications, processes, functions, workloads). In this sense, the virtual security component 114 configured within a higher privileged virtual trust layer of the virtual resource unit emulates the functionality of the security component previously implemented in the host. By passing, or moving, the functionality of the security component from the host to the highly trusted virtual layer in the tenant's virtual resource unit, exposure of the tenant's data to vulnerabilities of the host is limited or completely eliminated.

For example, FIG. 2 illustrates another virtual resource unit 220 that exposes 222 the host components 214 to malicious software 224 via interactions facilitated by the virtual resource monitor 110. The tenant virtual resource unit 108 described herein is not affected by this exposure 222 due to the isolation provided by the virtual security component 114.

Figure 3:
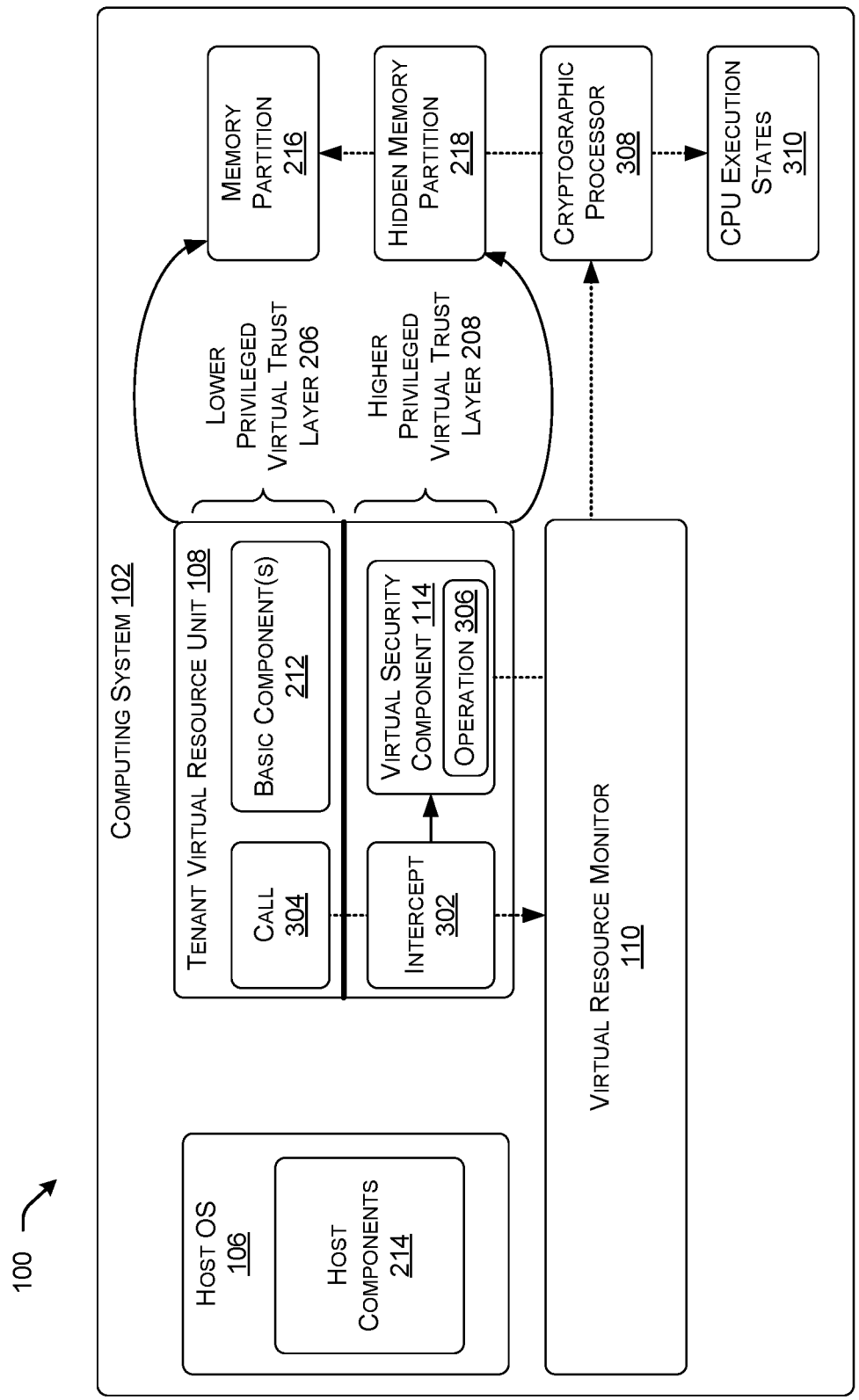
FIG. 3 illustrates an example environment where a higher privileged virtual trust layer that includes a virtual security component intercepts a call for a security operation and performs the security operation within the tenant virtual resource unit.

FIG. 3 further illustrates the environment 100 of FIGS. 1 and 2 in which the higher privileged virtual trust layer 208 where the virtual security component 114 is located intercepts 302 a call 304 for a security operation 306. The call 304, or request, may be made by one of the basic virtual resource components 212 (e.g., an application, a driver) and intended for the host operating system 106 by way of the virtual resource monitor 110.

As described above, the virtual security component 114 is configured to perform security operations for the tenant virtual resource unit 108 (e.g., operations to create and store cryptographic keys, operations to secure communications, operations to confirm that operating system components have not been tampered with by an unauthorized actor). One example of a virtual security component 114 is a vTPM. Via a higher privileged virtual trust layer 208, the virtual security component 114 may include secure access to a cryptographic processor 308 of the computing system 102. This secure access is not exposed to the host components 214 that are part of the host operating system 106 or in some way connected to the host operating system 106. As part of the security operation 306, the cryptographic processor 308 is configured to encrypt the memory partitions 216 and 218 used by the tenant virtual resource unit 108 and/or to encrypt CPU execution states 310 of the tenant virtual resource unit 108.

Figure 4:
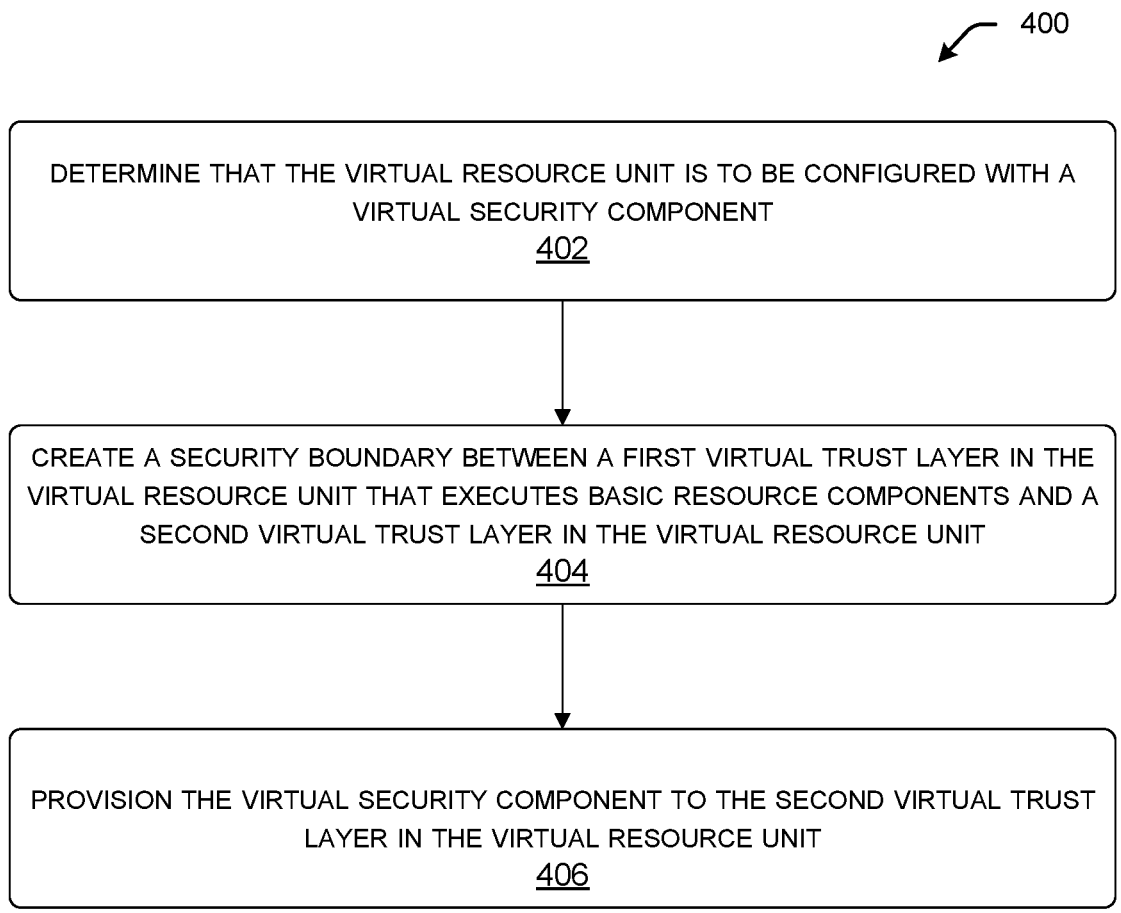
FIG. 4 is an example flow diagram showing aspects of a routine for provisioning a security component to a tenant virtual resource unit.

FIG. 4 is a flow diagram showing aspects of a routine for provisioning a security component to a tenant virtual resource unit. At operation 402, it can be determined that a virtual resource unit is to be configured with a virtual security component. At operation 404, a security boundary is created between a first virtual trust layer in the virtual resource unit that executes basic resource components and a second virtual trust layer in the virtual resource unit. The second virtual trust layer is a higher privileged virtual trust layer compared to the first virtual trust layer. At operation 406, the virtual security component is provisioned to the second virtual trust layer in the virtual resource unit.

Figure 5:
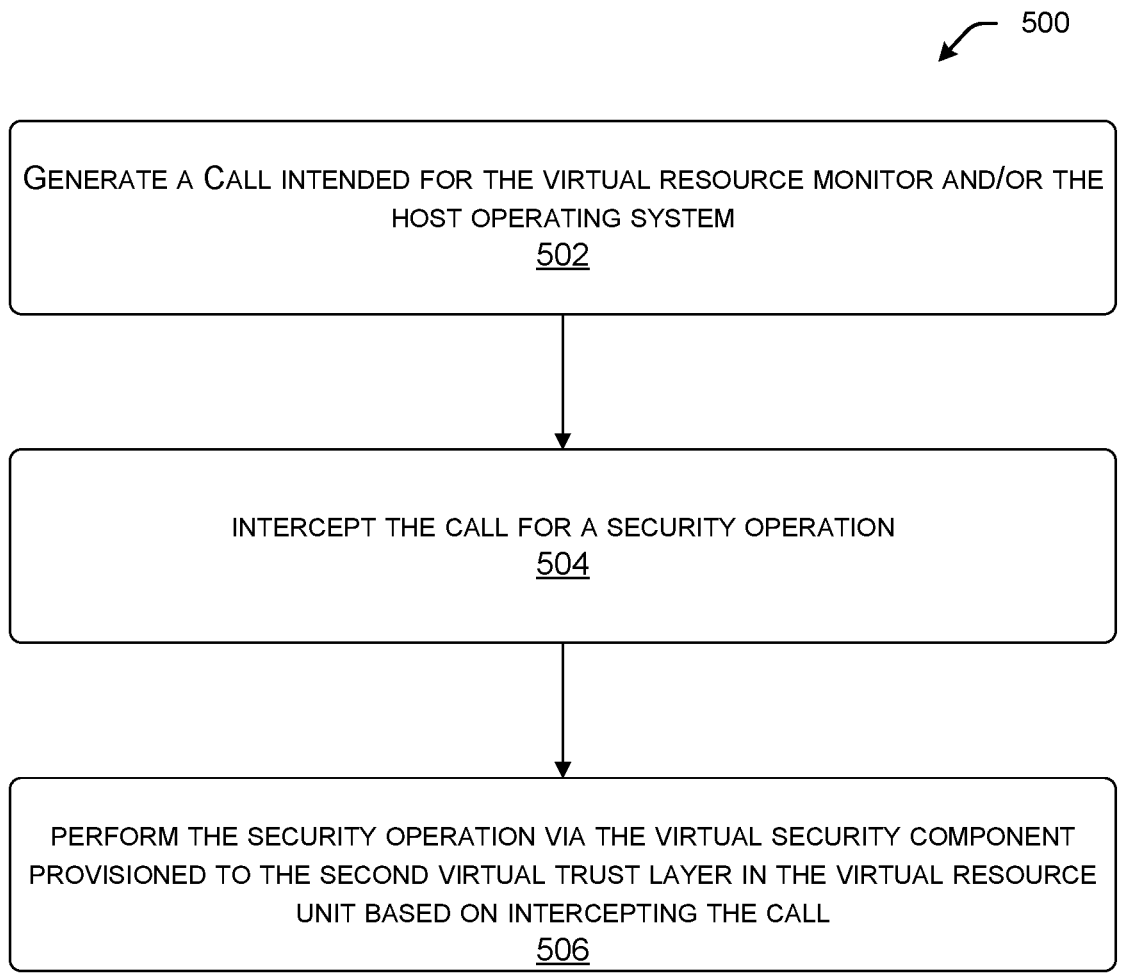
FIG. 5 is an example flow diagram showing aspects of a routine for intercepting a call for a security operation and for performing the security operation within the tenant virtual resource unit.

FIG. 5 is a flow diagram showing aspects of a routine for intercepting a call for a security operation and for performing the security operation within the tenant virtual resource unit. At operation 502, a call for a security operation is generated by a basic virtual resource component executing in the first virtual trust layer. The call is intended for the virtual resource monitor and/or the host operating system. At operation 504, the call for the security operation is intercepted. At operation 506, the security operation is performed via the virtual security component provisioned to the second virtual trust layer in the virtual resource unit based on intercepting the call. Again, the second virtual trust layer is a higher privileged virtual trust layer compared to the first virtual trust layer. As described above, performance of the security operation utilizes hardware to encrypt memory used by the virtual resource unit or to encrypt central processing unit (CPU) execution states of the virtual resource unit.

For ease of understanding, the processes discussed in this disclosure are delineated as separate operations represented as independent blocks. However, these separately delineated operations should not be construed as necessarily order dependent in their performance. The order in which a process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed above is a matter of choice dependent on the performance and other requirements of a computing device. Accordingly, the logical operations described can be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described above.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described above are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described above can be referred to variously as states, operations, structural devices, acts, or modules. These operations, structural devices, acts, and modules may be implemented in software, in firmware, in special purpose digital logic, and any combination thereof.

Figure 6:
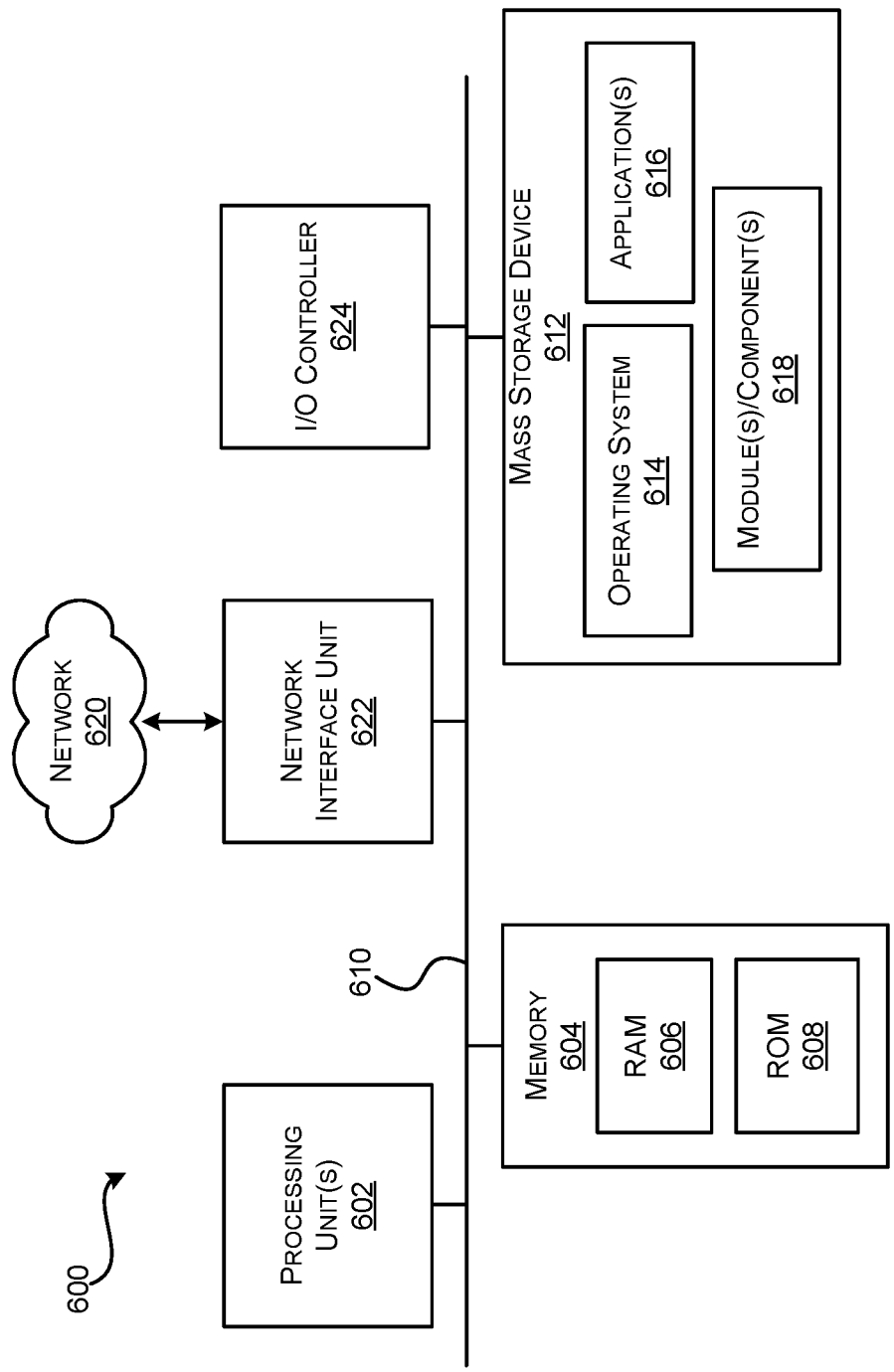
FIG. 6 is a computer architecture diagram showing an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform, capable of executing computer instructions (e.g., a module or a component described herein). The computer architecture 600 illustrated in FIG. 6 includes processing unit(s) 602, a system memory 604, including a random-access memory 606 (RAM) and a read-only memory (ROM) 608, and a system bus 610 that couples the memory 604 to the processing unit(s) 602. The processing units 602 may also be comprise or be part of a processing system. In various examples, the processing units 602 of the processing system are distributed. Stated another way, one processing unit 602 of the processing system may be located in a first location (e.g., a rack within a datacenter) while another processing unit 602 of the processing system is located in a second location separate from the first location.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules/components 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc ROM (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
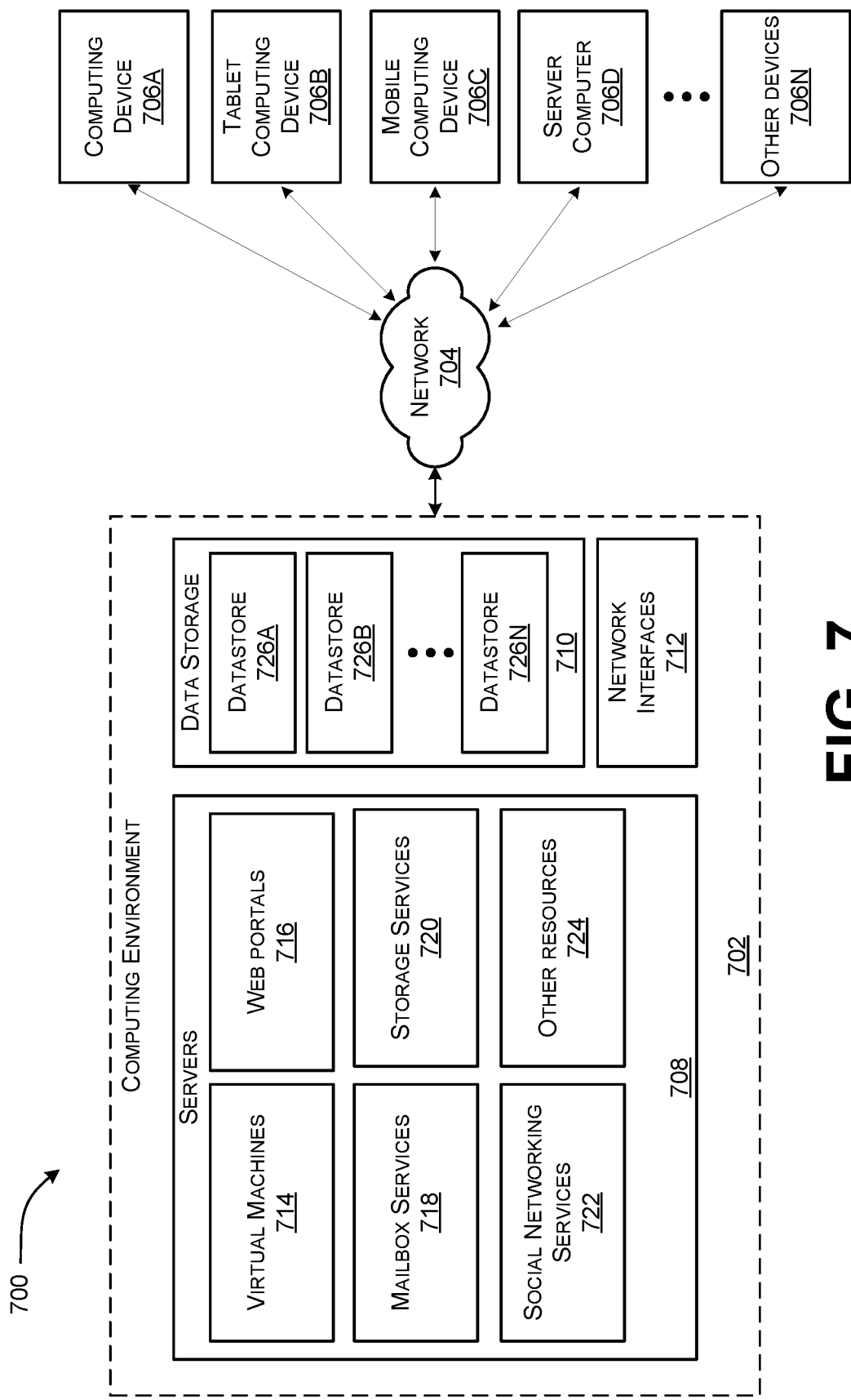
FIG. 7 is a diagram illustrating a distributed computing environment capable of implementing aspects of the techniques and technologies presented herein.

FIG. 7 depicts an illustrative distributed computing environment 700 capable of executing the components described herein. Thus, the distributed computing environment 700 illustrated in FIG. 7 can be utilized to execute any aspects of the components presented herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7, the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 708 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for isolating a virtual resource unit, to be executed by a tenant of a cloud-based platform, from components of a host configured within the cloud-based platform, the method comprising: determining that the virtual resource unit is to be configured with a virtual security component; creating a security boundary between a first virtual trust layer in the virtual resource unit and a second virtual trust layer in the virtual resource unit, the first virtual trust layer executing basic resource components; and provisioning the virtual security component to the second virtual trust layer in the virtual resource unit, thereby enabling the second virtual trust layer in the virtual resource unit to: intercept a call, directed to the host, for a security operation; and perform the security operation via the virtual security component based on intercepting the call for the security operation, wherein performing the security operation utilizes hardware to encrypt memory used by the virtual resource unit or to encrypt central processing unit (CPU) execution states of the virtual resource unit.

Example Clause B, the method of Example Clause A, wherein the virtual resource unit comprises a virtual machine or a container.

Example Clause C, the method of Example Clause A or Example Clause B, wherein the virtual security component comprises a virtual trusted platform module.

Example Clause D, the method of any one of Example Clauses A through C, wherein the security boundary defines first privileges for the first virtual trust layer and second privileges for the second virtual trust layer, wherein the second privileges include a privilege not included in the first privileges.

Example Clause E, the method of Example Clause D, wherein the privilege includes a memory partition that is hidden from the basic resource components executing within the first virtual trust layer.

Example Clause F, the method of Example Clause E, further comprising using second level address translation to hide the memory partition from the basic resource components executing within the first virtual trust layer.

Example Clause G, the method of any one of Example Clauses A through F, wherein the virtual security component is an emulation of a security component implemented by the host.

Example Clause H, the method of any one of Example Clauses A through G, wherein creating the security boundary comprises applying a security-based rule within a hypervisor of the host.

Example Clause I, the method of any one of Example Clauses A through H, wherein the determination is based on customer input specific to the virtual resource unit.

Example Clause J, the method of any one of Example Clauses A through H, wherein the determination is based on predefined information accessible via a subscription for the tenant.

Example Clause K, a system comprising: a processing system; and a computer-readable medium having encoded thereon computer-readable instructions that, when executed by the processing system, cause the system to: create a security boundary between a first virtual trust layer in a virtual resource unit of a tenant of a cloud-based platform and a second virtual trust layer in the virtual resource unit, wherein the security boundary defines first privileges for the first virtual trust layer and second privileges for the second virtual trust layer, wherein the second privileges include a privilege not included in the first privileges; and isolate the virtual resource unit from components of a host configured within the cloud-based platform by provisioning a virtual security component to the second virtual trust layer in the virtual resource unit thereby enabling the second virtual trust layer in the virtual resource unit to: intercept a call, directed to the host, for a security operation; and perform the security operation via the virtual security component based on intercepting the call for the security operation, wherein performing the security operation utilizes hardware to encrypt memory used by the virtual resource unit or to encrypt central processing unit (CPU) execution states of the virtual resource unit.

Example Clause L, the system of Example Clause K, wherein the virtual resource unit comprises a virtual machine or a container.

Example Clause M, the system of Example Clause K or Example Clause L, wherein the virtual security component comprises a virtual trusted platform module.

Example Clause N, the system of any one of Example Clauses K through M, wherein the privilege includes a memory partition that is hidden from basic resource components executing within the first virtual trust layer.

Example Clause O, the system of Example Clause N, wherein the computer-readable instructions further cause the system to use second level address translation to hide the memory partition from the basic resource components executing within the first virtual trust layer.

Example Clause P, the system of any one of Example Clause K through O, wherein creating the security boundary comprises applying a security-based rule within a hypervisor of the host.

Example Clause Q, the system of any one of Example Clause K through P, wherein the computer-readable instructions further cause the system to determine that the virtual resource unit is to be configured with the virtual security component based on customer input specific to the virtual resource unit.

Example Clause R, a method for isolating a virtual resource unit from components of a host configured within a cloud-based platform, the method comprising: intercepting a call directed to the host, by the virtual resource unit, for a security operation, the virtual resource unit being configured with a security boundary between a first virtual trust layer that executes basic resource components and a second virtual trust layer that executes a virtual security component; and performing the security operation via the virtual security component provisioned to the second virtual trust layer in the virtual resource unit, the performing the security operation utilizing hardware to encrypt memory used by the virtual resource unit or to encrypt central processing unit (CPU) execution states of the virtual resource unit.

Example Clause S, the method of Example Clause R, wherein the security boundary defines first privileges for the first virtual trust layer and second privileges for the second virtual trust layer, wherein the second privileges include a privilege not included in the first privileges.

Example Clause T, the method of Example Clause S, wherein the privilege includes a memory partition that is hidden from the basic resource components executing within the first virtual trust layer.

Example Clause U, a system for isolating a virtual resource unit from components of a host configured within a cloud-based platform, the system comprising: a processing system; a computer-readable medium; and the virtual resource unit, components of which are executed by the processing system and stored on the computer-readable medium, that is configured with a security boundary between a first virtual trust layer that executes basic resource components and a second virtual trust layer that executes a virtual security component.

Example Clause V, the system of Example Clause U, wherein the second virtual trust layer is configured to: intercept a call, directed to a host, for a security operation; and perform the security operation via the virtual security component based on intercepting the call for the security operation, wherein performing the security operation utilizes hardware to encrypt memory used by the virtual resource unit or to encrypt central processing unit (CPU) execution states of the virtual resource unit.

Example Clause W, the system of Example Clause U or Example Clause V, wherein the security boundary defines first privileges for the first virtual trust layer and second privileges for the second virtual trust layer, wherein the second privileges include a privilege not included in the first privileges.

Example Clause X, the system of Example Clause W, wherein the privilege includes a memory partition that is hidden from the basic resource components executing within the first virtual trust layer.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different virtual trust layers).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:
1. A method for isolating a part of a virtual resource unit, to be executed by a tenant of a cloud-based platform, from components of a host configured within the cloud-based platform, the method comprising:

determining that the virtual resource unit is to be executed on the host and configured with a virtual security component;

creating a security boundary between a first virtual trust layer within the virtual resource unit and a second virtual trust layer within the virtual resource unit, wherein:

the first virtual trust layer within the virtual resource unit is assigned a first memory partition associated with execution of components that are accessible to host software components; and the second virtual trust layer within the virtual resource unit is assigned a second memory partition that is isolated from the execution of the components that are accessible to the host software components via the security boundary; and provisioning the virtual security component to the second virtual trust layer within the virtual resource unit, thereby enabling the second virtual trust layer within the virtual resource unit to:

intercept a call, directed to the host software components, for a security operation; and perform the security operation via the virtual security component based on intercepting the call for the security operation, wherein performing the security operation utilizes hardware to encrypt the second memory partition and central processing unit (CPU) execution states of the virtual resource unit.

2. The method of claim 1, wherein the virtual resource unit comprises a virtual machine.

3. The method of claim 1, wherein the virtual security component comprises a virtual trusted platform module.

4. The method of claim 1, wherein the security boundary defines a privilege for the second virtual trust layer that is not included in a set of privileges defined for the first virtual trust layer.

5. The method of claim 1, wherein the second memory partition is hidden from the components that are accessible to the host software components.

6. The method of claim 5, further comprising using second level address translation to hide the second memory partition from the components that are accessible to the host software components.

7. The method of claim 1, wherein the virtual security component is an emulation of a security component implemented by the host.

8. The method of claim 1, wherein creating the security boundary comprises applying a security-based rule within a hypervisor of the host.

9. The method of claim 1, wherein the determination is based on tenant input specific to the virtual resource unit.

10. The method of claim 1, wherein the determination is based on predefined information accessible via a subscription for the tenant.

11. The method of claim 1, wherein the virtual resource unit comprises a container.

12. A system comprising:

a processing system; and a computer-readable medium having encoded thereon computer-readable instructions that, when executed by the processing system, cause the system to:

create a security boundary between a first virtual trust layer within a virtual resource unit of a tenant of a cloud-based platform and a second virtual trust layer within the virtual resource unit, wherein:

the first virtual trust layer within the virtual resource unit is assigned a first memory partition associated with execution of components that are accessible to host software components; and the second virtual trust layer within the virtual resource unit is assigned a second memory partition that is isolated from the execution of the components that are accessible to the host software components via the security boundary; and provision a virtual security component to the second virtual trust layer within the virtual resource unit thereby enabling the second virtual trust layer within the virtual resource unit to:

intercept a call, directed to the host software components, for a security operation; and perform the security operation via the virtual security component based on intercepting the call for the security operation, wherein performing the security operation utilizes hardware to encrypt the second memory partition and central processing unit (CPU) execution states of the virtual resource unit.

13. The system of claim 12, wherein the virtual resource unit comprises a virtual machine.

14. The system of claim 12, wherein the virtual security component comprises a virtual trusted platform module.

15. The system of claim 12, wherein the computer-readable instructions further cause the system to use second level address translation to isolate the second memory partition from the execution of the components that are accessible to the host software components.

16. The system of claim 12, wherein creating the security boundary comprises applying a security-based rule within a hypervisor of the host.

17. The system of claim 12, wherein the computer-readable instructions further cause the system to determine that the virtual resource unit is to be configured with the virtual security component based on tenant input specific to the virtual resource unit.

18. The system of claim 12, wherein the virtual resource unit comprises a container.

19. A method for isolating a part of a virtual resource unit from software components of a host configured within a cloud-based platform, the method comprising:

intercepting, by the virtual resource unit executing on the host, a call directed to the software components of the host for a security operation, the virtual resource unit being configured with a security boundary between a first virtual trust layer that is assigned a first memory partition associated with execution of components that are accessible to the software components of the host and a second virtual trust layer that is assigned a second memory partition that is isolated from the execution of the software components of the host, the second virtual trust layer including a virtual security component; and performing the security operation via the virtual security component included in the second virtual trust layer of the virtual resource unit, the performing the security operation utilizing hardware to encrypt the second memory partition and central processing unit (CPU) execution states of the virtual resource unit.

20. The method of claim 19, wherein the virtual resource unit comprises a virtual machine.

* * * * *